Jan. 21, 1969 E. C. STARBUCK 3,423,551
PRESSURE SENSITIVE SWITCH
Filed Jan. 12, 1966
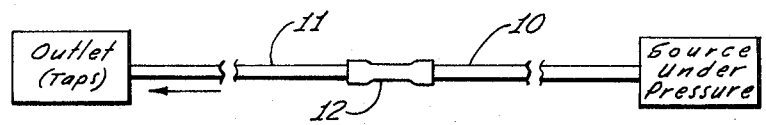
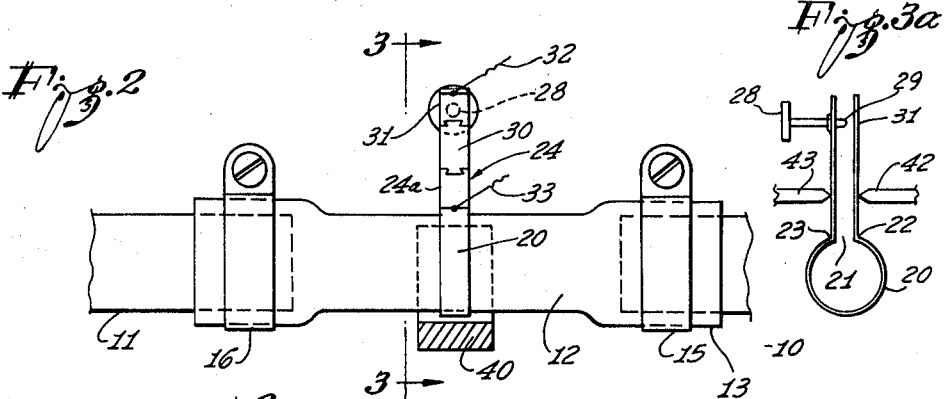
INVENTOR:
Elbert C. Starbuck
Attorneys

United States Patent Office 3,423,551
Patented Jan. 21, 1969

3,423,551
PRESSURE SENSITIVE SWITCH
Elbert C. Starbuck, Northridge, Calif., assignor to Beertronic Corporation, Van Nuys, Calif., a corporation of California
Filed Jan. 12, 1966, Ser. No. 520,272
U.S. Cl. 200—83                 16 Claims
Int. Cl. H01h 35/40

ABSTRACT OF THE DISCLOSURE

Several pressure responsive switches are disclosed in which a deformable, cylindrical tube can be or is inserted into a pipeline. The elastic deformation of the tube, due to pressure variations, is sensed so that for a low pressure condition little or no resiliency interaction exists with the tube while increasing pressure sets up resilient interaction so that the sensor tends to restore its original position. The sensor has a pivot point, at least one point or area of interaction with the tube and preferably a remotely positioned operating area for amplifying the pivot motion resulting from interaction with the tube.

---

The present invention relates to a pressure sensitive device, and particularly to an electric switch responding to various pressure conditions of a fluid in a conduit system.

The pressure in a pipe or conduit system is usually measured with the aid of a branch or probing pipe monitoring the pressure of the fluid passing through. A plunger, diaphragm or the like is variably displaced by the fluid column in the probing pipe as the pressure changes. The plunger or diaphragm displacement is then converted into a signal which can be used for indicating and/or controlling the pressure conditions. This method of measuring the pressure of the fluid invariably results in the provision of cavities, pockets or the like, in the conduit system. These are particularly regions communicating with the main flow but side tracking a portion thereof. Such probing pipes constitute regions of stagnation of the fluid. If the fluid is subject to decomposition or decay, frequent cleaning of the measuring device is required.

This problem is particularly present where the fluid is a liquid destined for human consumption, for example, a beverage, such as beer which is dispensed from a tap or faucet and is drawn from a keg under pressure and passing through a conduit system to the tap. Since frequent cleaning of such pockets containing stagnating liquid is undesirable and difficult, such pockets must be avoided. For purposes of monitoring and/or metering the flow it is desirable to measure the pressure in the conduit system, and it is essential that this is done in a manner which does not produce areas of stagnation such as cavities, where the liquid may decay.

It is an object of the present invention to provide a pressure sensing device which does not have regions where stagnation may occur, and which is responsive in a low as well as a high pressure range. According to the invention it is suggested to use an expandable tube as part of the conduit system, whereby the tube has normal cylindrical interior configurations without any cavity or distortion. The tube must have sufficient elasticity to expand or contract as the pressure varies, but since expansion and contraction must be reversible the resulting changes in diameter of the tube will be minute. The expansion and contraction of the tube is monitored externally and translated into larger displacement values, by providing pivot motion in response to the expansion and contraction. The pivoting is amplified by lever arm action to provide a displacement value sufficient to produce contact making and breaking of a switch through a relatively wide pressure variation.

In one form of the invention, the pivot motion is produced by means responding to the contraction and expansion of the tube in a manner which provides little or no resilient counterforce to the tube at low pressure conditions in the tube. Under high pressure conditions the pivot means resiliently interacts with the tube so that upon reestablishing low pressure conditions, the pivot means follow this movement to pivot back into the position associated with low pressure conditions. Thus, the process is a reversible one whereby particularly the expansion of the tube is not effectively impeded by resilient reaction of the pivoting means. This is important because expansion and contraction of the tube covers only small changes diameter of the tube, as the tube must not be weakened by the pressure change.

In the preferred form of the invention, the pivoting means is a metallic band, bent to envelope the tube and to engage it at several discrete points or over a large angular range of its periphery, leaving only a small gap which is widened or narrowed as the tube expands or contracts. At the gap, there are outwardly extending arms which pivot relative to each other as the gap changes dimensions; the longer the arms, the larger is the displacement of the tips of the arms relative to each other during expansion and contraction of the tube. The tips of the arms bear contacts which open or close an electric circuit to thus provide an indication of the electric conditions. This embodiment and other embodiments of the invention and further objects, features and advantages of the invention will become more apparent from the description of the drawings, in which:

FIGURE 1 illustrates somewhat schematically the environment for utilization of the invention;

FIGURE 2 is a side elevation of the preferred embodiment of the invention;

FIGURE 3 illustrates a cross section of the pressure sensitive switch illustrates in FIGURE 2, taken in the plane 2—2 as defined in FIGURE 2;

FIGURE 3a illustrates somewhat schematically how the operation of the embodiment shown in FIGURES 2 and 3 can be modified;

FIGURES 4 and 5 respectively illustrate cross sections through two other embodiments of the invention;

FIGURE 6 is a sectional view into still another embodiment of the invention;

FIGURES 7 and 8 respectively show an elevational view of and a cross sectional view through another embodiment of the invention; and FIGURES 9 and 10 illustrate respectively elevation and cross section of a modification of the switching arrangement of the embodiment shown in FIGURES 7 and 8.

Proceeding now to the detailed description of the drawings in FIGURES 2 and 3 thereof there is shown a first example of the inventive switch. The general environment for using such a switch is shown in FIGURE 1.

There is shown a first pipe 10 and a second pipe 11, and it may be assumed that a reservoir or source of liquid is connected to the pipe 10. An outlet, tap, faucet, or destination reservoir is connected to the pipe 11.

In the particular example envisioned here the pipe 10 may run, for example, from a beer keg and the pipe 11 may lead to a plurality of taps. The two pipes 10 and 11 are liquid conductively interconnected by means of a hose or tube 12. The end portions 13 and 14 of the hose 12 are slipped respectively over the ends of the pipes 10 and 11. Clamping rings 15 and 16 respectively clamp the hose end 13 to the pipe 10, and the hose end 14 to the pipe 11.

The tube 12 is made, for example, of "Latex" and has a thickness of such dimensions that variations of the pressure of the liquid in this conduit system 10, 12, 11 result in definite and distinct changes in diameter of the tube. The thickness of its wall must lend sufficient strength to the tube so that upon changes in pressure over an expected range the resulting expansion and contraction of the tube is reversible without resulting in a permanent widening. However, the tube must be elastic to undergo noticeable changes in its diameter, though they may be minute.

The tube 12 has approximately its normal diameter $d_0$ under unbiased conditions established when the tap is open and liquid flows from the source through pipe 10, tube 12, pipe 11 to the tap. The static pressure differential of the liquid relative to the atmosphere may be negligibly small. When the outlet or tap is closed, the full liquid pressure such as it may exist in the beer keg acts on the walls of the tube 12 thereby causing the tube 12 to expand and to assume the diameter $d_1$.

The expansion and contraction of tube 12 is monitored by a device resembling a spring clip. This spring clip includes an open ring 20 which almost completely envelopes a central portion of tube 12 leaving a gap 21 of rather narrow dimensions. The open end portions 22 and 23 of the ring 20 are continued in two outwardly extending arms 24 and 25 respectively. The arms 24 and 25 extend in outward direction with reference to the axis of the tube.

The arm 25 is provided with a threaded bore 27 receiving an adjusting screw 28 with rounded tip 29. The arm 24 has a first portion 24a which is an integral portion of the band shaped piece which forms ring 20 and arm 25. An insulating piece 30 is secured to the end of portion 24a to form a continuation of the arm. A flat metallic blade 31 is secured to the insulating blade 30. The spring clip including ring 20, arm 25 and the portion 24a of arm 24 are preferably made of a metal band which is bent to form the open ring and the arm extensions 24a and 25. This clip has a particular unbiased configuration. Any attempt to spread the arms or to change the dimensions of gap 21 will result in a resilient reaction tending to return the clip to its unbiased configuration. The insulating piece 30 and the metal blade 31 though not integral with the band just referred to, still form the arm 24, and the elements 24a, 30 and 31 are a rigid arm assembly indeed.

As it can be seen, the metal screw 28 is in electric connection with arm 25, while the tip 29 may engage blade 31. The principal purpose of insulating piece 30 is the electrical separation of screw 28 and of the region where tip 29 contacts the metal of blade 31. The particular location of the insulating piece 30 is thus immaterial as long as it prevents current flow from screw 28 through the ring to blade 31. As indicated only schematically, an electric wire such as 32 connects to the contact blade 31 and another wire 33 connects to the ring 20, or it could connect to the screw 28 or to the arm 25 or to the arm portion 24a as all these later parts are electrically interconnected and are separated from blade 31 by insulator 30.

Thus, the screw 28 and particularly the tip 29 thereof on one hand and the blade 31 on the other hand form a switch. The switch is closed when tip 29 engages blade 31 thereby to permit electric current to flow in wires 32 and 33. When tip 29 is disengaged from blade 31, the switch has its open position and current flow is interrupted.

The ring 20 has an inner surface 20a which engages the outer circumference of the tube 12. In the illustrated position, the hose is presumed to have diameter $d_0$, i.e., low pressure conditions prevail in the tube. The screw 28 is adjusted so that the tip 29 not only engages blade 31, but also exerts a slight pressure upon the blade 31 to resiliently bias the spring clip. The gap 21 and the diameter 20 are thus increased somewhat and have dimensions causing engagement of the inner surface 20a with tube 12 without exerting inwardly directed pressure onto the tube. The resilient reaction of the spring clip is taken up only by the screw 28 as long as low pressure conditions prevail in the tube. Moreover, the resilient reaction of the ring 20 ensures a firm contact between the tip of screw 28 and the metallic blade 31. In the illustrated position the tube has diameter $d_0$ and the switch is thus closed when there is no pressure or only a very low pressure in the tube 12. Thus, the closed circuit configuration when wire 32 is connected electrically to wire 33 establishes a particular electrical condition for such a low pressure condition in the tube 12 and the pipe system.

It may be assumed that now pressure is applied to the conduit system. For example, the tap or the outlet connected to the pipe 11 is closed, so that pressure is built up in the tube 12. The tube 12 will thereby expand from diameter $d_0$ to the diameter $d_1$, larger than $d_0$. The expansion of the tube 12 causes an expansion of the diameter of the ring 20 and accordingly a widening of the gap 21. The widening of the gap 21 means that the ring end 22 moves in the direction of arrow 35 while the ring end 23 moves in the direction as approximately indicated by the arrow 36. It can be seen that these arrows are curved because the movement is not a linear one.

Reference numeral 37 denotes the point or area of ring 20 diametrically opposite to the center of gap 21. In view of the symmetrical arrangement of the ring with arms in relation to a plane running through point 37 and the center of gap 21, this point 37 can be considered as reference point for pivot motion. The tube 12 when expanding causes the two ring ends to pivot about point 37, and gap 21 widens accordingly. The distance between point 37 and gap 21 is approximately $d_0$ or $d_1$, the difference between these values being minute and do not enter into the following consideration.

The gap 21 is widened by a distance approximately equal to $(d_1-d_0)\pi$, as the ring ends pivot away from each other. The gap 26 is now widened by that value times the ratio:

$$\frac{\text{length of arms 24 or 25} + d_0 \text{ (or } d_1)}{d_0 \text{ (or } d_1)}$$

Thus, the arrangement provides for a pivoting of levers to separate the tip 29 from the blade 31. The actual widening of gap 26 is a trifle smaller than the theoretical value, because a portion of the tube widening $d_0 \rightarrow d_1$ is taken up by the relaxing of the contact pressure exerted by the screw 28 upon arm 24, this being a matter of adjustment. Of course, the expansion of the tube from diameter $d_0$ to the diameter $d_1$ is a rather minute one, so are the movements of the ring ends 22 and 23, but the amplification due the lever action of the arms 24 and 25 enlarges this distance as effective in the gap region 26. The arm tips are thus displaced for a distance sufficiently large for separating the tip 29 from the contact piece 31. Thus the pressure increase in the conduit system 10–11–12 at closed outlet conditions causes the electrical connection between the wires 32 and 33 to be interrupted.

It will be noted that this electrical pressure sensing switch is not accompanied by the creation of any kind of cavity in the conduit system which could create stagnating liquid or even a re-shaping of the tube. In case, for example, of beer or any other liquidous foodstuff which may be subject to decay this avoidance of any cavity or creation of a cleaning difficulty is of extreme importance.

The screw 28 primarily serves the purpose that the closed and open contact conditions can be defined and adjusted very accurately. As soon as the contact is open, and as soon as the contact piece 31 is separated from the tip 29 of screw 28 for a distance sufficient to prevent any arcing at the existing voltage between wires 32 and 33, further movement of the contacts is not needed. Therefore, there is provided a bridge 40 with an adjusting screw 41 engaging ring 20 to prevent undue expansion of the ring 20, and thereby to limit the distance of separation of tip 29 from contact piece 31.

As soon as the tap or the outlet of pipe 11 is opened again, the pressure drops, and the tube 12 contracts to diameter $d_0$. Since the ring 20 is resilient, it follows the contraction of the tube 12, and particularly the two ring ends 22 and 23 pivot in directions opposite to arrows 35 and 36, so that the contacts 29 and 31 close to re-establish closed circuit conditions. FIGURE 3a illustrates somewhat schematically a modification of the switch. Stops 42 and 43 establish fulcrum points rather close to gap 21 between ring ends 22 and 23. This way, the ends of arms 24 and 25 pivot towards each other when gap 21 widens. Accordingly, screw 28 is adjusted so that for low pressure conditions and at a diameter $d_0$ of tube 12, the contacts 29–31 are open. As the pressure increases, the tip 29 of screw 28 pivots towards contact 31, and at a tube diameter $d_1$ the contact is closed. The distance of the fulcrums from gap 21 on one hand, and from the contacts on the other hand define the amplification of the widening of the tube by lever action. It can be seen further, that at high pressure conditions with the contacts being closed, the closed contacts and the fulcrums operate as stops for excessive tube expansion, so that the device 40–41 is not needed in this modification.

FIGURE 4 illustrates an embodiment of the invention which is somewhat simpler from a manufacturing standpoint in comparison with the embodiment shown in FIGURES 2 and 3. In this embodiment, the spring clip is formed by a band which is not bent into a ring such as ring 20 in FIGURES 2 and 3, but it has the shape of an irregular but symmetrical pentagon. The configuration is readily derivable from FIGURE 4. There is a flat base portion 51, flanked by about uprightly extending portion 52 and 53 to form bents 50a and 50b. Portions 54 and 55 respectively contiguous with portions 52 and 53, form bents 52a and 53a respectively therewith. Then there is also a gap 60, and there are two arms 56 and 57 extending from bents 54a and 55a, respectively.

The two arms 56 and 57 form an angle and, the upper region of arms 56 and 57 are separated by a gap 61 which is wider than gap 60. The screw 28 extends in the region of gap 61, here from arm 56. Reference numeral 58 denotes an insulated section in arm 57 to thereby insulate a contact piece 59 from the screw 28 in arms 56 and from all parts which are in electrical connection with the screw 28. At low pressure conditions in the tube 12 the screw 28 together with the contact piece 59 define a closed circuit configuration. The contact piece 59 also exerts a slight contact pressure against the tip 29 of the screw 28, so that the spring clip is biased not to exert any pressure upon the tube.

The spring clip appears to be wrapped around the tube 12 so that it engages same at five discrete regions, one region for each of the portions 51 to 55. If now the pressure increases in the tube 12, it expands. It can now readily be seen that there is a step-wise amplification of the change in angles as between the various portions of part 50. The base 51 remains in position but the two portions 52 and 53 both adjoining base portion 51, pivot in opposite and outward directions because the expanding tube tends to enlarge the angles between portion 51 on one hand and the portions 52 and 53 on the other hand. Independently from any further consideration this pivot motion is amplified by lever operation for widening gap 61 in that the arms 56 and 57 likewise respectively pivot about the points 50a and 50b.

The pivot motion which the tube forces upon the areas of contact with the pieces 52 and 53 may suffice to separate tip 29 from contact piece 59. For this, only a three point contact between tube 12 and the wrapper 50 is needed. However, it should be mentioned that the spring clip must envelope the tube sufficiently, i.e., gap 60 must be small so that the spring clip cannot slide off the tube. In addition, the portions 54 and 55 thus engage also the tube and are pivoted relative to the portions 52 and 53 respectively about the bents 52a and 53a. Therefore, an additional lever motion is imposed upon the arms 56 and 57, and this lever motion is likewise amplified in relation to the distance, for example, of the tip 29 from the bents 52a and 53a, and in further relation to the distance these bents have from the point of contact of the tube 12 with portions 54 and 55.

Thus, the pressure increase causing only a slight expansion of the diameter of the tube 12, is translated into a pivot motion of the contact bearing arms, and the relative extension of the arms from the pivot points amplifies this change in dimension of the tube so that sufficient displacement is produced as between the tip 29 of screw 28 and the contact piece 59, to open up the electrical connection otherwise established by the closed contacts 29 and 59.

FIGURE 5 illustrates another embodiment of the invention. Here it is presumed that the tube 12 has rather thick walls but still has sufficient elasticity. The tube 12 is provided with a groove 71 extending peripherally over an angle 70. The groove has a maximum depth in a region 72, thereby defining a thinning of the wall of tube 12 at region 12a. The groove merges smoothly into the otherwise ungrooved outer circumference of the tube 12 in regions 73 and 74. This groove thus establishes in the tube 12 regions 12b and 12c wherein the diameter of the tube or the thickness of the tube's wall varies in peripheral directions. The wall has minimum thickness in region 12a.

A contact blade 75 is attached, for example, glued or otherwise secured to the bottom of the groove, at region 12b, and close to the area where the groove merges into the ungrooved peripheral of the tube. The blade 76 thus extends tangentially away from the tube and has a definite position in relation to a stationary contact 77. The tube is positioned so that the tip 76 of blade 76 exerts a slight contact pressure upon contact 77, to define the closed contact position of the switch. The tube 12 must be otherwise arrested in this position, so that it cannot rotate as a whole about its axis. This does not present any problem because, as it can be seen from FIGURE 2, the tube 12 is clamped to the pipes, and the pipes, of course, are not moving about their own axis, so that the position of this contact tip 76 is a definite one indeed.

The position illustrated in FIGURE 5 again is the position in which the contacts are closed, and it may be presumed that this is again established for low pressure in the tube 12. Now, as the pressure increases, the tube will tend to expand. The region 12a of minimum wall thickness of the tube will expand more than the portion diametrically opposed thereto. Thus, the pressure will expand this portion 12a radially in relation to the axis of the hose for a distance larger than it expands the opposite wall. This means that the portions 12b and 12c of the tube do not only expand radially but also have peripheral components, which are oppositely oriented. Thus, the arm or blade 75 with tip 76 is pivoted in the direction of the arrow 78. The longer the arm 75 is, the larger will be the displacement of the tip 76 of arm 75 as resulting from pivoting of the portion 12b of the tube. The pivoting of the groove in region 12b itself is a minute one, but the extension of blade 75 amplifies this movement, and the tip 76 thus moves for a distance sufficient to disengage from contact 77 and to recede therefrom sufficiently far to prevent arcing.

It is thus apparent that the high pressure-low pressure conditions are distinguished by two different positions of arm 75 in a plane perpendicular to the axis of tube 12 which is the plane of the drawing. Which one of these positions of arm 75 is the closed contact and which one is the open contact positions depends solely upon the position selected for stationary contact 77. If it were mounted on the other side of blade 75, the situation would be reversed. One can see further, that two contacts may be used, and that contact 76 then engages either the one or the other contact (77 or 77′), so that the two pressure states in the tube are associated with two distinct closed contact operating conditions.

FIGURE 6 illustrates another embodiment of the present invention. In this case the tube 12 runs through a sealed tank 80 filled, for example, with oil 81 or any other liquid, which is primarily to serve as an incompressible liquid. The tank 80 is closed at the top by a diaphragm 82, having a rather thin wall and being of sufficient elasticity. The diaphragm 82 bears a contact 83 at the outside.

At low pressure conditions in the tube 12, the diaphragm 82 will be rather flat, and the centrally located contact 83 is withdrawn from a stationary contact blade 84. As the tube 12 expands under pressure, the liquid 81 forces the diaphragm 82 in upward direction so that the contact 83 makes contact with the stationary contact blade 84 which may be of the leaf spring type. As the pressure in the tube 12 is reduced, the diaphragm acting through the liquid 81 contacts the tube, and the contact 83 is therefore retracted from engagement with contact 84.

FIGURES 7 and 8 show a still further embodiment of the invention. There are two leaf springs 90 and 91, each having one end positioned stationary in relation to the tube 12 whereby particularly the clamping ring 16 can be used to fasten the springs 90 and 91. This establishes pivot points 90′ and 91′, respectively. The two springs extend in parallel and axially to the tube; they respectively form noses 92 and 93 engaging the tube 12 in diametrically opposed locations.

A triple L-bent of each of the springs and respectively denoted 94 and 95 places the other ends 96 and 97 respectively of springs 90 and 91, into close parallel positions so that contact pieces 98 and 99 on these ends may respectively engage each other to define a closed contact position. This closed contact condition is established for low pressure when noses 92 and 93 are apart from each other by the diameter $d_0$. As the tips of the two springs are in engagement with each other, they counteract the mutually effective resiliency of each of them whereby little or no pressure is exerted upon the tube by the noses. As the pressure increases, and the tube widens, noses 92 and 93 are displaced in opposite directions, and springs 90 and 91 are biased resiliently by the expanding tube which spreads the noses apart to be apart by $d_1$. The expansion is amplified by lever action, because the noses are (axially) closer to the pivot points 90′ and 91′ than contact pieces 98 and 99 are from the pivot points. Thus, at high pressure conditions the contacts will open. Upon decrease of the pressure, the relaxing resiliency of the springs causes the noses to follow the contraction of the tube and the contacts reclose. It can readily be seen, that either one of the contact springs 90 or 91 suffices and can cooperate with a stationary contact, whereby, of course, at given axial dimensions and distance from the pivot point half the displacement value at the spring tip is available. The stationary contact can be on either side, or one on each side, just as shown in FIGURE 5.

FIGURES 9 and 10 illustrate a modification of the spring levers shown in FIGURES 7 and 8. The upper spring lever 90 has a straight portion 102 and a laterally formed loop 104 so that its contact piece 106 is upwardly directed. The lower lever 92 has again a triple L with a rather large upwardly extending portion 101, so that the contact piece 103 faces down. Thus, when noses 92 and 93 are at distance $d_0$ for low pressure, the contact is open. As the tube expands and noses 92 and 93 spread apart to distance $d_1$, the contacts close.

The invention is not limited to the embodiments described above, but all changes and modifications thereof not constituting departures from the spirit and scope of the invention are intended to be covered by the following claims.

What is claimed is:

1. Device for sensing pressure variations in a conduit system, comprising:
   an elastic tube for insertion into the conduit system to be passed through by fluid under variable pressure conditions;
   first means externally engaging said tube to be responsive to expansion and contraction of said tube and having a first operative relationship with said tube at low pressure conditions in said tube, retaining the internal dimensions of the tube, there being substantially no resilient interaction between tube and engaging means, said first means having a second operative relationship with said tube at high pressure conditions in said tube, wherein the resulting expansion of said tube sets up a resilient reaction in said engaging means tending to re-establish the first operative relationship at pressure drop in said tube; and
   second means coupled to the first means responsive to said first and said second operative relationship to establish respectively first and second switching states indicative of low or high pressure conditions in said tube.

2. Device for sensing pressure variations in a conduit system, as set forth in claim 1, said first means including a resilient spring clip like member receiving the tube and having arms extending away from the tube, said second means including contacts on the arms whereby in the first operative relationship at low pressure conditions the portion of the member receiving the tube merely engages the tube, and the contacts are closed, and in the second operative relationship at higher pressure conditions the expanding tube spreads the arms and contacts apart.

3. Device for sensing pressure variations in a conduit system, as set forth in claim 1, said first means including a tank with liquid containing said tube and being closed by a disphragm pushed outwardly in said second operative relationship, said second means including a contact moving with said diaphragm.

4. Device for sensing pressure variations in a conduit system comprising:
   an expandable, cylindrical tube for insertion in the conduit system to be passed through by fluid under variable pressure conditions;
   first and second means having variable operative relationships with each other, at least said first means contacting said tube externally, and partially enveloping the tube following the undeformed outer contour thereof, the first and second means being reversibly displaced in relation to each other upon variation of pressure in said tube to establish the variable operative relationships, the displacement produced being larger than the corresponding expansion and contraction of the tube, said first and second means having at least at low pressure conditions in said tube substantially no resilient interaction with said tube so that the tube retains its normal cross section; and
   third means responsive to said displacement to provide an output indicative of the pressure conditions in the tube.

5. Device for sensing pressure variations in a conduit system, comprising:
   an expandable, cylindrical tube having a round cross section and being inserted in the conduit system to be passed through by fluid under variable pressure conditions;
   means in external contact with the external surface of said tube, and partially enveloping a portion of the tube in random position in relation to the interior of said tube following the undeformed outer contour of the tube so that the means has subtantially no resilient interaction with said tube at particular low pressure conditions so that the cross section of the tube remains round, the means having increasing resilient interaction with the tube at increasing pressure in said tube, and providing a variable displacement in amplified relation to the expansion of said tube under increasing pressure in said tube; and electric circuit means responsive to said variable displacement to provide an electric output indicative of the pressure conditions in said conduit system.

6. Device for sensing pressure variations in a conduit system, comprising:

an expandable cylindrical tube for insertion in the conduit system to be passed through by fluid under variable pressure conditions;

first means in external contact with said tube in random position in relation to the interior of the tube and following the expansion and contraction of the tube at pressure variations in the tube, whereby at least at low pressure conditions the tube is resiliently unbiased from the contact with the first means to maintain a uniform internal cross sectional area;

second means included in said first means to amplify the displacement resulting from tube expansion and contraction, to produce considerably larger displacements representative of said expansion and contraction; and electric circuit means responsive to said larger displacement to produce an electric output indicative of the pressure condition in said conduit system.

7. Device for sensing pressure variations in a conduit system comprising:

an expandable cylindrical tube for insertion into the conduit system to be passed through by fluid under variable pressure conditions;

a spring clip having a portion partially enveloping said tube and contacting the external surface of said tube, said spring clip terminating in two outwardly extending arms, there being a narrow gap between the arms adjacent the tube, the gap between the arms being wider at the tips of the arms, said spring clip having little resilient interaction with said tube at low pressure conditions in said tube while resiliently interacting with said tube at high pressure conditions therein, thereby spreading said arms apart; and contacts mounted on said arms and engaging each other for the contact making at low pressure conditions in said tube, while disengaged from each other when said arms are spread at higher pressure conditions in said tube, there being insulating means to prevent electrical connection between said contact pieces through said spring clip.

8. A device as set forth in claim 7, said spring clip having a polygon shaped portion to engage said tube at discrete areas.

9. A device as set forth in claim 7, said spring clip being shaped as an open ring having a gap, and having arms extending obliquely from the ring configuration at the gap.

10. Device for sensing pressure variations in a conduit system, comprising:

an expandable cylindrical tube for insertion into the conduit system to be passed through by fluid under variable pressure conditions;

first means in external contact with at least one surface portion of the undeformed outer contour of said tube to provide resilient interaction with the tube at pressures higher than a particular low pressure condition in the tube and pivoting as the tube expands and contracts due to variable pressure conditions therein, to provide a displacement range larger than the dimensions of the tube expansion and contraction; and second means having variable position relationships to said first means to provide an output representative of variable pressure conditions in said tube and in response to the pivot motion of said first means, 11. A device as set forth in claim 10, said first means including a contact arm tangentially extending from and attached to the tube at a region of non-uniform thickness of the wall of the tube to permit pivoting of the contact arm in response to pressure changes in the tube, said second means being a stationary contact for making or breaking contact with the contact of said first means.

12. A device as set forth in claim 10, said first and second means being linked to each other for at least partially enveloping said tube and for translating expansion and contraction of said tube into oppositely oriented pivot motions for changing the distance between the first and second means.

13. A device as set forth in claim 10, said first means including a lever and further including means to define a pivot point for said lever, said lever including means for engaging the wall of said tube at a first distance from the pivot point, said lever further supporting a contact, at a second distance from said pivot point which second distance is larger than said first distance, said lever pivoting upon variation of pressure in said tube, said second means including contact means cooperating with said contact on said lever for contact making and breaking in response to pressure variations in the tube.

14. A device as set forth in claim 13, said second means including a second lever mounted to define a second pivot point, further including means for engaging the wall of the said tube for imparting a pivot motion upon said second lever directed oppositely to the lever of said first means.

15. Device for sensing pressure variations in a conduit system, comprising:

an expandable tube in the conduit system to be passed through by fluid under variable pressure conditions;

means having a first portion defining a pivot point, a second portion in external contact with the external surface of said tube, and a third portion remote from said first portion and from said second portion where contacting said tube, so that upon variation of pressure in said tube and resulting expansions and contractions of said tube, said third portion is subjected to pivot motion about said pivot point whereby the pivoting displacement of said third portion is larger than of said second portion; and means responsive to said displacement of said third portion to provide an electric output indicative of the pressure conditions in said tube.

16. Device for sensing pressure variations in a conduit system, comprising:

an expandable, cylindrical tube for insertion in the conduit system to be passed through by fluid under variable pressure conditions;

resiliently biasable pivoting means externally contacting said tube with little resilient reaction therewith to maintain a round cross section of the cylindrical tube at low pressure conditions therein and increasing resilient reaction at increasing pressure conditions in said tube whereby the expanding tube pivots said pivoting means and upon decreasing pressure conditions the resilient reaction of the resilient means reverses its pivot motion; and means responsive to the pivot motion of said pivoting means in a region remote from the area of contact of said pivoting means and said tube, the remote region of said pivoting means exhibiting a larger pivoting displacement than said area of contact.

(References on following page)

References Cited

UNITED STATES PATENTS

| | | | |
|---|---|---|---|
| 2,517,820 | 8/1950 | Aagaard | 200—83 |
| 1,602,770 | 10/1926 | Kantor | 200—83.91 |
| 2,520,660 | 8/1950 | Sedgwick | 200—83.91 |
| 2,749,536 | 6/1956 | Sperling | 200—83 X |
| 2,885,506 | 5/1959 | Anderson | 200—83.91 |
| 3,233,059 | 2/1966 | Pridham et al. | 200—83 |
| 3,304,386 | 2/1967 | Shlesinger | 200—83 |

FOREIGN PATENTS 49,268  11/1940  Netherlands.

OTHER REFERENCES

German application 1,029,910 May 14, 1958, Kesselring.

BERNARD A. GILHEANY, *Primary Examiner.*

H. B. GILSON, *Assistant Examiner.*

U.S. Cl. X.R.

73—262; 340—239